W. SLEICHER, Jr.

Treating Iron.

No. 7,949. Reissued Nov. 13, 1877.

Witnesses:

M. Gardner

J. B. Littlewood

Inventor:

William Sleicher, Jr.

by G. H. W. S. Howard

Atty.

UNITED STATES PATENT OFFICE.

WILLIAM SLEICHER, JR., OF TROY, NEW YORK.

IMPROVEMENT IN TREATING IRON.

Specification forming part of Letters Patent No. 168,293, dated September 28, 1875; Reissue No. 7,949, dated November 13, 1877; application filed July 23, 1877.

*To all whom it may concern:*

Be it known that I, WILLIAM SLEICHER, Jr., of the city of Troy, in the county of Rensselaer and State of New York, have invented a certain Process of Melting and Refining Iron, for purposes hereinafter named, together with the means for carrying such process into effect, of which invention the following is a specification; and I do hereby declare that the same is a full, clear, and exact description of the said invention, reference being had to the accompanying drawing, and to the letters of reference marked thereon.

My invention may be applied to general foundry purposes, but is specially designed for the treatment of iron for malleable castings, which iron, it is known, must be of a high grade, and crystallized or freed in a great degree from carbon.

The invention relates, first, to the process of melting and refining iron, whereby this character is imparted to it; and consists in placing in the cupola a fuel of coke and charcoal in specified proportions, and running the molten metal from the cupola to a refining furnace or furnaces, where it is refined, as hereinafter set forth.

The invention consists, secondly, of the combination, in the manner hereinafter specified, of a cupola with one or more reverberatory furnaces and a stack, the furnace or furnaces being of that class from which the iron is delivered in a molten state, as contradistinguished from puddling-furnaces, from which the iron, after treatment, is taken in balls.

The part of my invention capable of illustration is shown in the annexed drawings, forming a part of this specification.

Figure 1:
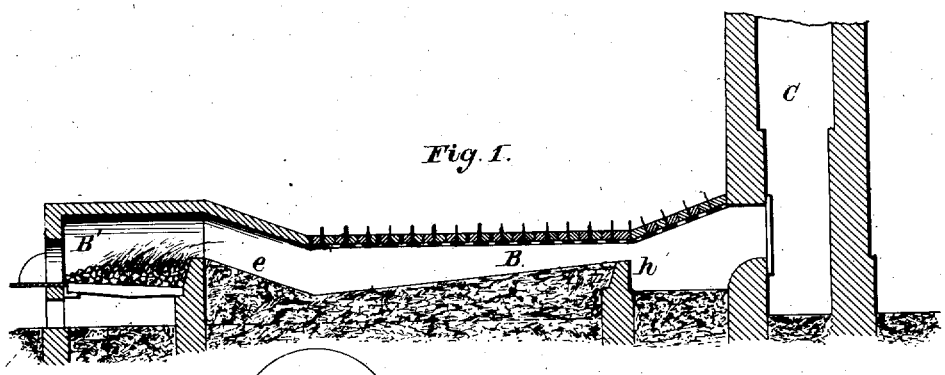
Figure 2:
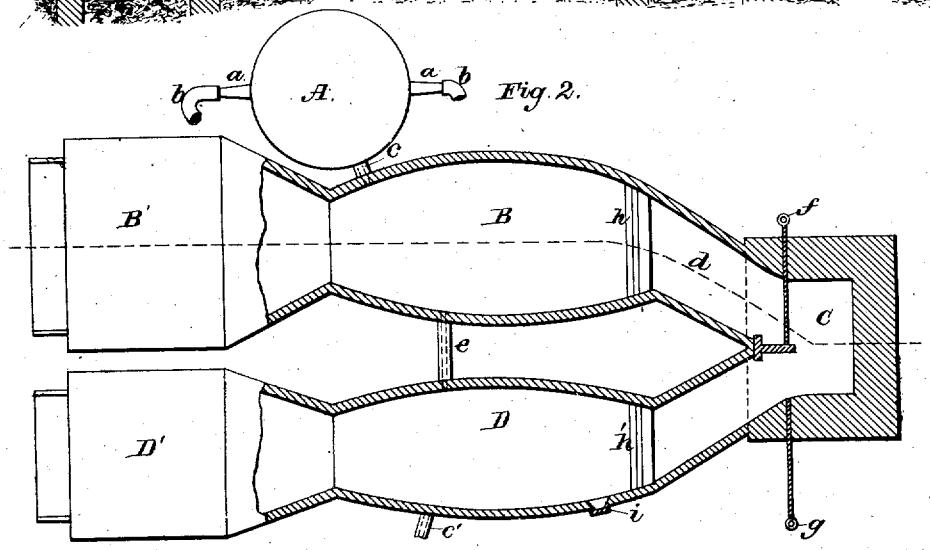
Figure 3:
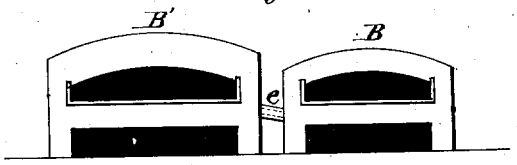

Figures 1, 2, and 3 are, respectively, a longitudinal section, a sectional plan, and a front view, of my improved apparatus in its preferred form.

Similar letters of reference indicate similar parts of the invention in all the views.

Referring to Figs. 1, 2, and 3, A is an ordinary cupola, the tuyeres of which are represented by *a*, and the pipes leading therefrom by *b*. B is a reverberatory furnace, and, as an intermediate receptacle for the iron, is placed contiguously to and fed by the cupola through the trough *c*. The furnace B has a construction substantially as shown, the channel *d* of which leads to the chimney C.

D is another reverberatory furnace, having a connection with the furnace or receptacle B by means of the trough *e*, and from which the metal is poured at *e'*. The hearth of the furnace B is about one foot higher than that of the furnace D, enabling the molten metal to flow by its own gravity into the latter. The size of the furnace B is about one-third larger than that of the furnace D.

The plans of the furnaces are shaped about as shown, which shape I prefer, as it enables the iron to be spread over the greatest practical area at a small depth, which distributes the reacting or reverberatory operation of the heat from the arched roofs to the best advantage. The cupola, furnace, and chimney are made wholly of, or lined with, fire-brick.

The furnaces proper, or fire-chambers, marked, respectively, B' and D', are placed at the fronts of the furnaces B and D. The grate-bars are represented by *e'*, which fall to the bridge-wall *e''*. The roofs of the furnaces B and D rise to the crowns of the fire-chambers B' and D', as shown, the fire and heat being thereby deflected upon the iron resting upon the respective hearths of the furnaces B and D. The stoke-holes of the fire-chambers, as seen in Fig. 3, extend nearly across the fronts of the fire-chambers, enabling the fireman to bank the fuel well up into the same. The exterior sides of the fire-chambers are braced with wall-plates and tied with bolts. The roofs of the furnaces B and D are formed of layers of fire-brick resting upon removable T-shaped supports reversed, and which can be removed singly by means of hooks or other appliances. That portion of each furnace leading to and entering the chimney is made to rise, as shown, the reverberatory character of the furnace being thus seen. Each furnace is supplied with a suitable damper or shut-off, represented, respectively, by *f* and *g*, by means of which either furnace can be used singly, or the entire combination of both furnaces, cupola, and chimney employed.

Where it is desired to run off the first heat to the furnace D, the trough for the cupola is made long enough to reach thereto.

This feature of my invention is very useful in emergencies where the engine furnishing the blast becomes disarranged or incapable of use. In such an emergency, by shutting off the connection between the furnaces D and B, the natural draft through the single furnace superinduced by the height of the chimney would cause sufficient draft for temporary uses.

It is, of course, understood that the dampers would be necessarily fire-proof. The result accomplished by the dampers could be reached by stopping up the communication between the furnaces by means of fire-brick.

Each furnace is provided in that part thereof approaching the chimney with a bridge-wall, *h h'*. A skimming-door, *i*, is shown in the side of the furnace D, which, when opened, is used by the furnace-man to skim, with a suitable implement, the surface of the iron.

In cases where the cupola would not at all times be employed, and the artificial draft produced by the altitude of the chimney would not be ample, a blast from a centrifugal or other blower could be used by means of a single pipe branching to each furnace. Slag-holes are provided, by means of which the chimney is cleared.

The foregoing sets forth the preferred manner in which I use my invention; but substantially the results obtained thereby are accomplished by placing the cupola centrally of the two air-furnaces, as herein described, the cupola to have two spouts, and this arrangement I consider the equivalent of the arrangement first described.

As a part of the process of melting, refining, and treating iron by means of my improved apparatus, the fuel which I employ in the cupola is composed of about two-thirds coke and one-third charcoal, more or less. I find that this mixture of the two substances as a fuel is highly beneficial to the iron when treated in the manner hereinbefore described. Charcoal, as is known, has the property of centralizing or absorbing gases from the iron, while coal impregnates it with its sulphurous properties. Especially do I find that the charcoal and coke in the above proportions purify the iron from slag for malleable purposes.

The iron heating rapidly in the cupola, it is necessary to tap it about every ten minutes, else the iron would run through the tuyeres. It is also necessary to run the iron quickly to the furnace, in order that the character given to the iron by the charcoal may not be lost. It is here subjected to the action of the furnace consequent upon its reverberatory construction; but to gain the fullest advantages of my invention it is necessary to run the iron through both furnaces, that the character of the iron may not deteriorate by contact with that constantly drawn from the cupola, which is not refined.

It is therefore seen that the second furnace, when used in this connection, admits of the iron remaining a short time—say, ten minutes—in the first furnace for refining purposes, which refining has been, in part, accomplished, first, by the charcoal fuel, and, next, by the action of the first furnace.

Experience has shown me that about ten minutes' use of the first furnace is sufficient to refine the iron, so that the refining is completed in the second furnace.

When both furnaces are used the refining is completed in the second furnace, and the difference in the sizes of the two furnaces, as herein given, one being considerably larger than the other, enables me to continually have a sufficient supply of iron in D for malleable casting of a proper grade and character for the purpose. The furnace B retains the iron or holds it back, while a smaller quantity is more perfectly refined for the purposes intended. Thus the process of melting and refining proceeds without interruption, experience having shown me that the capacities of the cupola and respective furnaces are such as to permit the continuance of the operation without stoppage.

My preferred arrangement of air-furnaces and cupola, and the process hereinbefore described, when employed, produces also the following advantageous results: Eight tons of iron can be taken out of furnaces of one ton capacity in five hours, instead of in eighteen hours where two air-furnaces are used without the union therewith of the cupola. The iron is always hot and better graded, anneals more readily, and is purer and tougher. One-third less in the quantity of fuel and fire-brick is required by my process.

In my furnace the iron, being in a liquid condition, occupies less height than when in an unmelted state, and the covers can therefore be brought near to the surface of the iron, and the flame reverberated thereto with great advantage. A light fire can also be used, there being but a small space to heat.

I do not claim an arrangement of cupola, furnace, and chimney in which the channel leading from the cupola to the furnace is in communication with the chimney, through or under which the molten metal from the cupola must pass before reaching the furnace.

Neither do I claim an arrangement of cupola, furnace, and chimney in which the action of the furnace is not to reflect or reverberate the flame from the roof of the furnace to the metal upon the hearth, but to cause the blast of the air-furnace to pass through the metal when falling in a molten state over falls from the roof of the furnace.

Having described my invention, what I claim as new, and wish to secure by Letters Patent of the United States, is—

1. The process of melting and refining iron by adding in the cupola a fuel of about two-thirds coke and about one-third charcoal, and subjecting the metal to the action of a flame reflected or reverberated upon a bed or hearth, to which the metal is run from the cupola, substantially as herein specified.

2. The combination of a reverberatory furnace, having a spout for running off refined metal, a chimney in communication with said furnace, and a cupola having a trough wholly exterior of the chimney, but leading the metal direct to the furnace, substantially as herein set forth.

3. In combination, a cupola, a pair of independent reverberatory furnaces, and a chimney common to both, the furnaces being capable of joint or independent action in the process of melting and refining iron, substantially as set forth.

4. In combination with a cupola, a high and a low independent reverberatory furnace, leading from one to the other by a trough or spout, and a chimney common to and communicating with both furnaces, substantially as and for the purpose specified.

In testimony whereof I have hereto subscribed my name this 3d day of July, A. D. 1877.

WM. SLEICHER, JR.

Witnesses:
J. W. CIPPERLY,
I. H. HUNTINGTON.